United States Patent [19]
Roberts

[11] 4,023,844
[45] May 17, 1977

[54] LARGE GAME CARRIER

[76] Inventor: Wendell E. Roberts, 3450 Dillon Acres, Zanesville, Ohio 43701

[22] Filed: Aug. 15, 1975

[21] Appl. No.: 605,196

[52] U.S. Cl. .................................. 294/26; 294/79
[51] Int. Cl.[2] ........................................ B65G 7/12
[58] Field of Search ....................... 294/17, 26, 79; 119/152; 43/2.5; 17/44.2, 14, 17, 21, 24

[56] References Cited
UNITED STATES PATENTS

| | | | |
|---|---|---|---|
| 901,057 | 10/1908 | Autenrieth | 294/26 |
| 1,738,844 | 12/1929 | Roberts | 294/26 |
| 2,411,856 | 12/1946 | Harding | 294/79 |
| 2,812,206 | 11/1957 | Brunn | 294/26 |
| 2,890,678 | 6/1959 | Mincey | 294/79 |

*Primary Examiner*—James B. Marbert
*Attorney, Agent, or Firm*—Mahoney & Stebens

[57] ABSTRACT

A large game carrier is provided having a structural arrangement readily permitting folding of elements of the unit into a relatively compact configuration for transport. The carrier includes a pivot block having a game engaging hook rigidly attached thereto and a pair of hand-grip or handles hinged to the pivot block for swinging movement relative thereto. These handles are pivoted to swing about parallel axis from oppositely extending positions perpendicular to the game engaging hook to positions mutually parallel to each other and to the hook for transport. Additionally, an eye-bolt is secured to the pivot block at a side opposite the game engaging hook to permit attachment thereto of an elongated rope permitting an additional person to assist in moving and transporting of the game.

7 Claims, 5 Drawing Figures

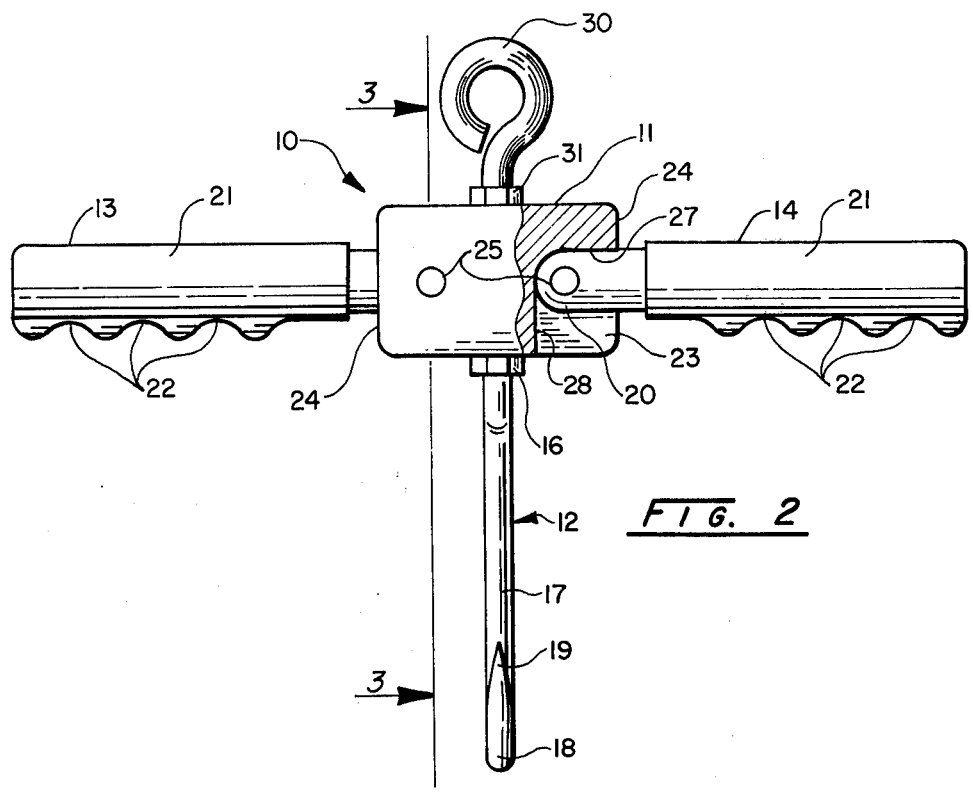
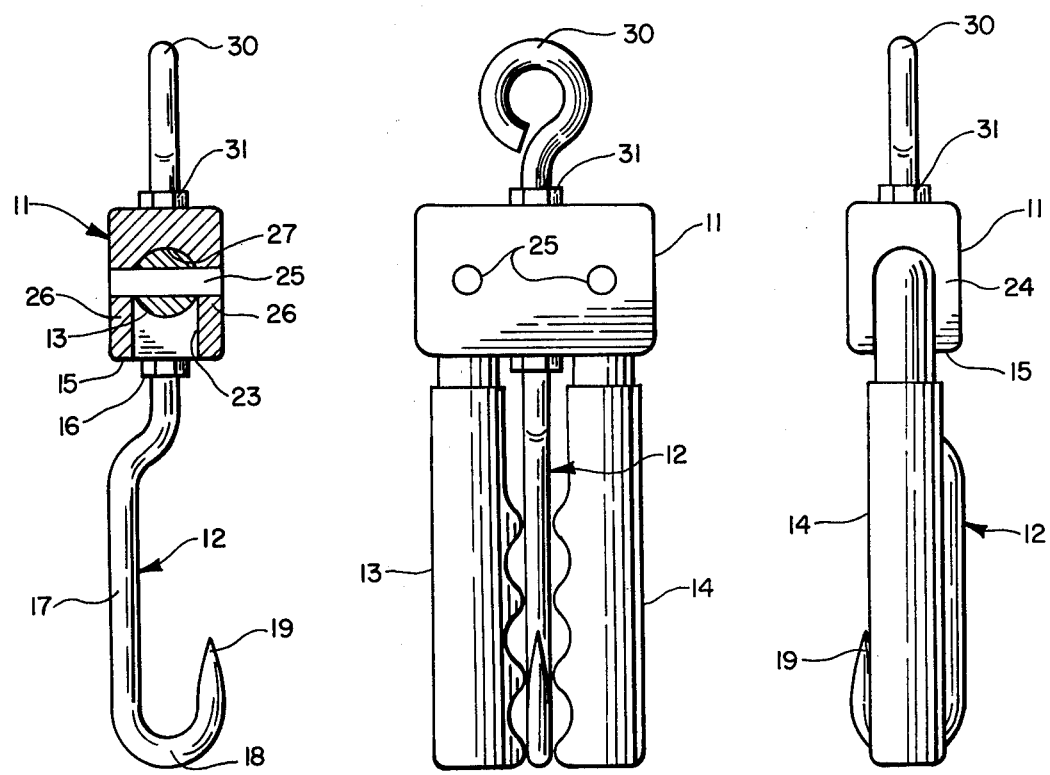

LARGE GAME CARRIER

BACKGROUND OF THE INVENTION

Game carriers of various types have heretofor been provided or utilized to facilitate a hunter's removal of the game from the hunting area. Difficulty in removal of game is a particularly significant factor with respect to the hunting of large game such as deer and bear, or other similar larger sized animals, in densely forested areas and rough terrain that are not accessible by vehicles. Hook-type devices are known for use in connection with carrying and transport of game birds, however these devices are not structurally adequate or adapted for use in connection with large game. Traditionally, the most utilized game carrier comprised a length of rope which was tied to the animal, such as around the neck or the feet, and the hunter then merely dragged the animal along the ground. A disadvantage of a rope is that the hunter is not readily able to control movement of the animal except in a forward direction, and consequently the animal as it is being dragged may move transversely off a relatively narrow trail which may be located on a sloped surface. Furthermore, it is difficult for the hunter at the end of a rope at some distance from the animal to effectively manipulate the movement of the animal around corners and other obstructions.

Slings and other forms of carrying devices have also been provided and utilized to a limited degree. These slings and carrying devices may either comprise lengths of rope tying the animal's feet to a carrying bar or wood pole or the positioning of the animal on a litter-type sling. Some litter-type slings have taken the form of light weight ladder. However, devices such as slings or carrying litters have distinct disadvantages in that considerable effort is required to elevate the animal and, once elevated, the animal is in a readily visible position where other hunters may inadvertently shoot at the animal and thereby endanger the hunters carrying the animal. A further disadvantage of the litter-type carrying devices is that they are relatively bulky and substantially add to the weight of hunting apparel and equipment with which a hunter is ordinarily burdened.

SUMMARY OF THE INVENTION

In accordance with this invention, a game carrier is provided which is particularly adapted and utilized for the transport and movement of large game such as deer or bear. Game such as this is normally killed in densely forested areas inaccessible to vehicles thus making the removal of the animal a relatively difficult and physically exhausting task. This game carrier comprises a pivot block provided with a pair of handles and an elongated game engaging hook. Each of the handles is normally disposed in axially aligned and opposed relationship and perpendicular to the longitudinal axis of the hook. Each of two hunters may readily grip one of the opposed handles and, walking in tandem relationship they can easily pull a relatively large animal along a trail. With the hook securely engaged with the animals head, such as by the jaw structure, the hunters partially lift and carry the animal while pulling the remainder along the ground. An eye-bolt is also secured to the pivot block to permit attachment of a length of rope and the additional assistance of a third hunter in removal of an exceptionally large and heavy animal.

To render the game carrier of this invention readily transportable by a hunter, the two handles, which in an operative position extend transversely to the hook resulting in a T-shaped structure of a bulky nature, are hinged to the pivot block for swinging movement into mutually parallel relationship to each other and the elongated hook. This results in a device of relatively compact nature which may be readily inserted in a carrying sheath and merely hung from a hunters belt or placed in a large pocket of a hunting jacket. Sockets are formed in the pivot block in which the handles are pivoted to engage the handles and restrict movement in a pulling direction. The sockets thus cooperate with the handles in forming an effectively rigid structure.

This close coupling of the game carrier with the animal to be transported results in a particularly effective device for pulling and manuevering the animal. The hunters may readily direct the forward portion of the animal and thus maintain the animal on a trail and to manipulate the animal around obstructions. Additionally, the hunters are vertically supporting a portion of the animals weight and this reduces the force required for dragging the animal.

These and other objects and advantages of this invention will be readily apparent from the following detailed description of an embodiment thereof illustrated in accompanying drawings.

BRIEF DESCRIPTION OF THE DRAWINGS

The best mode contemplated in carrying out this invention is illustrated in the accompanying drawings in which:

FIG. 2 is a plan view of the game carrier with the handles thereof pivoted to an operative position.

FIG. 3 is a sectional view taken along line 3—3 of FIG. 2.

FIG. 4 is a plan view of the game carrier with the handles thereof pivoted to a folded, transport configuration.

FIG. 5 is a side view of the carrier as shown in FIG. 4.

DESCRIPTION OF THE ILLUSTRATED EMBODIMENT

Figure 1:
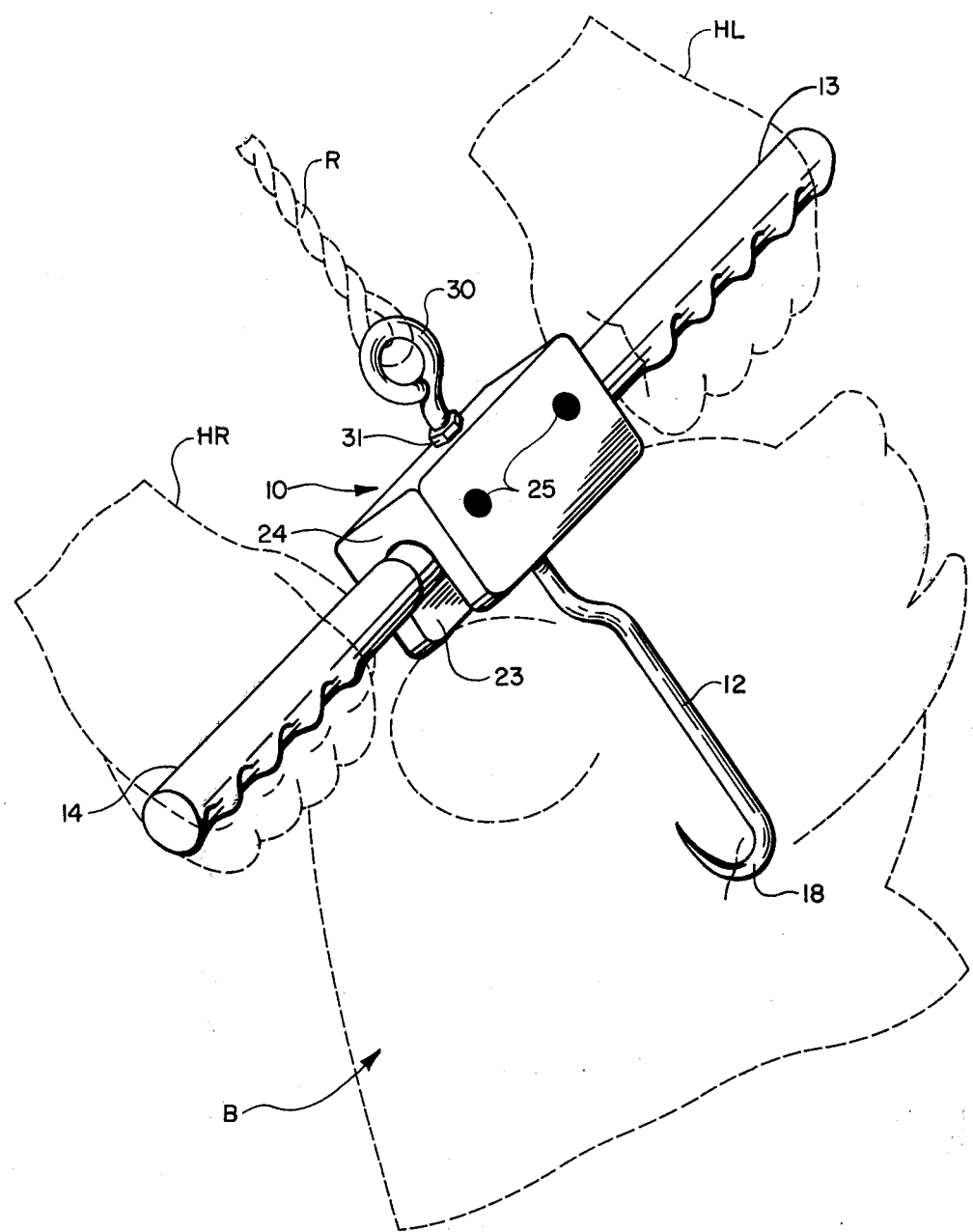
FIG. 1 is a perspective view of the game carrier illustrated in operative relationship with an animal shown in broken lines and supported by the hands of two hunters.

Having specific reference to FIG. 1, a game carrier 10 is shown as utilized in transport of an animal. In this drawing figure, an animal such as a bear B is representively shown in broken lines. The game carrier 10 comprises, in general, a pivot block 11, an elongated game engaging hook 12 rigidly secured thereto and a pair of handles 13 and 14. Use of the game carrier is further illustrated by the broken line representations of the left and right hands HL and HR of two hunters who would be walking in side-by-side tandem relationship.

Specific details of the structure of this game carrier 10 are best seen in FIGS. 2 and 3. With reference to these figures the pivot block 11 is rectangularly shaped and is machined from a block of suitable metal such as alloyed aluminum to provide the necessary structural strength. This pivot block 11 which has a relatively longer dimension perpendicular to the longitudinal axis hook 12 with the hook 12 comprising a rodlike device that is threaded into a socket formed in one of the longer side surfaces A15 of the pivot block. A lock nut 16 also threaded onto the hook 12 is turned into contacting engagement with the surface 15 of the block to assure maintenance of the desired alignment of the hook relative to the pivot block and handles. A lock nut arrangement or other similar locking device is necessary to reliably enable the hook 12 to resist the substantial twisting moment or force that may be encountered during use of the game carrier.

It will be noted with respect to FIG. 3 that the hook 12 is preferably formed with a central shaft portion 17 which is parallel to but laterally offset from the axis of the terminal end portion threaded into the pivot block 11. This offsetting of the central shaft portion 17 results in positioning the center of the hook element 18 on the longitudinal axis of the hook as connected to the pivot block for better force distribution. The free end 19 of the hook element is also sharpened to facilitate engagement with the animal.

In accordance with this invention each of the two handles 13 and 14 are pivotly connected to the pivot block 11 for relative swinging movement between an extended, operative position as shown in FIG. 2 and a folded, transport configuration as shown in FIG. 4. Each handle comprises an elongated cylindrical rod or shaft formed from a lightweight metal such as aluminum and having hemispherically shaped inner end 20. The major portion of each handle remote to the end 20 may also be advantageously provided with a slip-on type hand-grip 21 having finger notches 22 formed along the portion of the exterior surface thereof. If desired, a hand grip with finger notches may be integrally formed in the exterior surface of the cylindrical handle shaft. Separately formed hand grips 21 are preferably fabricated from a suitable resilient material such as plastic to enhance gripping of the handle and reducing hand slippage.

Pivotal interconnection of each of the handles 13 and 14 with the pivot block 11 can be best seen with reference to FIG. 2. End portions of each handle, including the hemispherically shaped end 20, project into respective cooperatively shaped sockets 23. These sockets 23 are located in opposed corners of the pivot block 11 and open both at the surface 15 thereof in the direction of the hook 12 and at the adjacent end surfaces 24 of the pivot block. Securing each handle 13 and 14 in its respective socket 23 is a pivot pin 25. Each pivot pin 25 is disposed in laterally spaced relationship to the longitudinal axis of the hook with the end portions projecting into and fixed in sockets formed in opposed sidewalls 26 of the socket 23. The handles 13 and 14 are journaled on the respective central portions of the respective pivot pins 25 with the axis of rotation with the pin being aligned with the radius of curvature of the hemispherically shaped end 20 of the handle.

One inner edge surface 27 of each socket 23 is disposed in parallel relationship to the surface 15 of the pivot block. This surface 27 is also spaced from the axis of rotation of the pivot pin 25 a distance equal to the diameter of the cylindrical handle. This relative arrangement of the pivot axis and handle surfaces to the socket surface 27 which is arcuately curved to mate with the handle results in a bearing surface against which the handle seats when pivoted to the extended operative position shown in FIG. 2. The pivot block 11 is of sufficient length to result in a socket depth such that the surface 27 which will bear against the cylindrical end portion of the handle, 13 or 14, will be of sufficient length to form a rigid structure capable of withstanding the pulling forces that may be encountered.

The other or second inner edge surface 28 of each socket 23 extends in spaced parallel relationship to the hook 12. The second surface 28 is not necessarily circularly configured to cooperatively receive the cylindrical handle but is spaced to permit pivoting of the handle to a position in parallel alignment to the hook for purposes of transport shown in FIG. 4.

Configuration of the game carrier for transport is shown in FIGS. 4 and 5. As can be seen in FIG. 4, both handles 13 and 14 are pivoted into mutually parallel relationship to each other and to the hook 12 for transport. By appropriate dimensioning, the pivot block 11 has a length such that the end surfaces 24 are spaced apart a distance approximately equal to the folded width of the handles resulting in a minimal configuration for carrying. The length of handles 13 and 14 are also substantially the same length as the hook 12 to result in protection and coverage of the sharpened hook element 18. With reference to FIG. 5 it will be seen that the transverse dimension or thickness of the pivot block 11 is of the order of the width of the hook 18 which is substantially concealed in side view by the handles 13 and 14 for additional protection relative to the sharpened hook element 19.

Additional pulling force may be applied to the carrier through the addition of an eye-bolt 30 to which a rope R may be tied as shown in FIG. 1. The eye-bolt 30 is also threaded into the pivot block 11 at the opposite side but in longitudinally aligned relationship to the hook 12 and is preferably provided with a lock nut 31. With the hook 12 engaged with the head of an animal, the pivot block 11 is vertically supported by the two hunters at each side and carrying a respective handle 13 or 14. The longitudinal force exerted by the rope R on the eye-bolt does not materially increase or affect this weight or force that is vertically carried by the hunters gripping the handles. A person pulling on the rope R would normally exert a force on this rope at an upwardly directed angle which is substantially in alignment with the longitudinal axis of the hook.

It will be readily apparent from the foregoing detailed description of the illustrative embodiment that a novel and particularly advantageous game carrier is provided for moving and transport of large game animals. This carrier is of an extremely strong construction capable of easily withstanding rugged use. The two handles provide a means to readily control directional movement of the animal through the elongated hook. Pivotal interconnection of the handles to pivot block having the game engaging hook rigidly secured thereto enables the handles to be readily folded against the hook thereby resulting in a compact transport configuration that is also relatively light weight.

Having thus described this invention, what is claimed is:

1. A game carrier comprising a pivot block having a central longitudinal axis, an elongated hook secured to said pivot block and disposed in alignment with said longitudinal axis, and a pair of elongated handles pivotally mounted on said pivot block for swinging movement between a folded position where the handles are disposed in mutually parallel relationship to each other and to said hook and a second position wherein said handles are disposed in substantially perpendicular relationship to said hook, said pivot block including means limiting pivotal movement of said handles from said folded position to said second position, said elongated hook including a shank portion and a curved hook element lying in a plane disposed perpendicularly to the plane in which said handles swing and is of a width substantially equal to the diametrical dimension of said handles; and said handles are of a length such that when disposed in said folded position, each handle extends at least to a terminal end of said hook whereby said curved hook element is effectively protected.

2. A game carrier according to claim 1 having an eye-bolt secured to said pivot block at a side thereof opposite to said hook and in alignment with said longitudinal axis.

3. A game carrier comprising a pivot block having a central longitudinal axis, an elongated hook secured to said pivot block and disposed in alignment with said longitudinal axis, and a pair of elongate handles pivotally mounted on said pivot block for swinging movement between a folded position where the handles are disposed in mutually parallel relationship to each other and to said hook and a second position wherein said handles are disposed in perpendicular relationship to said hook, said pivot block having a pair of sockets formed therein at opposite sides of said longitudinal axis and hook, each of said sockets having spaced sidewalls for receiving therebetween an end portion of a respective one of said handles, a pivot pin mounted in said sidewalls of each socket and extending therebetween through a respective handle for securing the handle in said socket for swinging movement, and including means limiting pivotal movement of said handles from said folded position to said second position, said means limiting pivotal movement of said handles including a bearing edge surface formed in each socket and disposed in perpendicular relationship to said longitudinal axis and spaced relative to a pivot axis of the respective handle such that a surface of the handle bears against said edge surface when swung to said second position.

4. A game carrier according to claim 3 wherein said edge surface is an elongated convex channel of cylindrical curvature and predetermined length and said handle has a cylindrical surface portion that cooperatively interfits with said edge surface.

5. A game carrier according to claim 3 wherein said handles are at least of a length such that, when disposed in said folded position, each handle extends to the terminal end of said hook.

6. A game carrier according to claim 3 wherein said elongated hook includes a shank portion and a curved hook element, said curved hook element lying in a plane disposed perpendicularly to the plane in which said handles swing.

7. A game carrier according to claim 6 wherein said hook element is of a width substantially equal to the diametrical dimension of said handles.

* * * * *